US012663645B1

(12) United States Patent
Seder et al.

(10) Patent No.: US 12,663,645 B1
(45) Date of Patent: Jun. 23, 2026

(54) RESTRICTED-VIEWING CONTROL FOR PANORAMIC HEAD-UP DISPLAYS

(71) Applicant: GM Global Technology Operations LLC, Detroit, MI (US)

(72) Inventors: Thomas A. Seder, Fraser, MI (US); Kai-Han Chang, Madison Heights, MI (US); Guy N. Kennerly, Southfield, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/000,878

(22) Filed: Dec. 24, 2024

(51) Int. Cl.
 *G02B 27/01* (2006.01)
 *G09G 3/00* (2006.01)
(52) U.S. Cl.
 CPC ......... *G02B 27/0101* (2013.01); *G09G 3/001* (2013.01); *G02B 2027/014* (2013.01); *G09G 2320/08* (2013.01); *G09G 2380/10* (2013.01)
(58) Field of Classification Search
 CPC .......... G02B 27/0101; G02B 2027/014; G09G 3/001; G09G 2320/08; G09G 2380/10
 See application file for complete search history.

(56) References Cited

U.S. PATENT DOCUMENTS

2013/0187770 A1* 7/2013 Moussa .............. G02B 27/0101
 340/425.5

FOREIGN PATENT DOCUMENTS

| CN | 117234338 A | * | 12/2023 |
| DE | 102015205871 A1 | * | 10/2016 |
| DE | 102019005193 A1 | | 1/2020 |
| DE | 102020113716 A1 | | 11/2021 |

* cited by examiner

*Primary Examiner* — Brent D Castiaux
(74) *Attorney, Agent, or Firm* — Honigman LLP; Matthew H. Szalach; Jonathan P. O'Brien

(57) ABSTRACT

A computer-implemented method includes determining that a first image displayed on a windshield of a vehicle by a first head-up display (HUD) is to be viewable by an operator of the vehicle and, based on determining that the first image is to be viewable by the operator, configuring the first HUD such that the first image is viewable by the operator. The method also includes determining that a second image displayed on the windshield by a second HUD is not to be viewable by the operator and, based on determining that the second image is not to be viewable by the operator, configuring the second HUD such that the second image is not viewable by the operator.

20 Claims, 6 Drawing Sheets

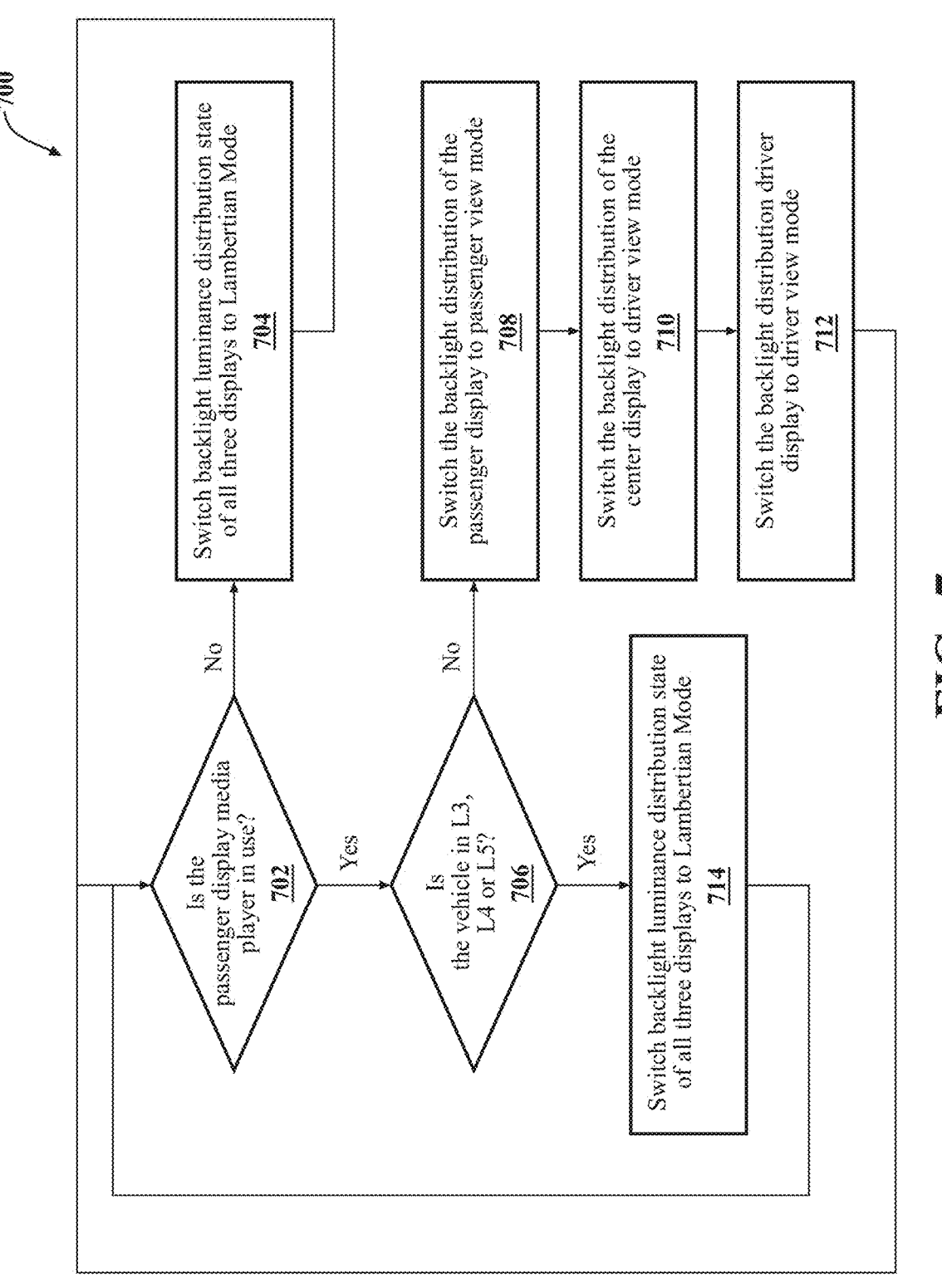

700

Is the passenger display media player in use? 702

No → Switch backlight luminance distribution state of all three displays to Lambertian Mode 704

Yes → Is the vehicle in L3, L4 or L5? 706

No → Switch the backlight distribution of the passenger display to passenger view mode 708 → Switch the backlight distribution of the center display to driver view mode 710 → Switch the backlight distribution driver display to driver view mode 712

Yes → Switch backlight luminance distribution state of all three displays to Lambertian Mode 714

FIG. 7

RESTRICTED-VIEWING CONTROL FOR PANORAMIC HEAD-UP DISPLAYS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

A head-up display (HUD) for a vehicle is an advanced technology that projects information directly onto the windshield of the vehicle, allowing operators to access the information without diverting their eyes from the road. This transparent display may include, for example, speed, navigation directions, fuel levels, and other vital metrics, enhancing situational awareness and safety. By integrating seamlessly with the vehicle's onboard systems, the HUD may help ensure that operators can maintain focus on their surroundings while staying informed about their vehicle's status and upcoming maneuvers. This innovative feature not only improves driving efficiency but also contributes to a more immersive and connected driving experience. A panoramic head-up display (HUD) includes two, three or more HUDs that display virtual images across the width of a windshield of a vehicle. Typically, each HUD is mated with a Lambertian lighting source that allows the virtual images presented by each HUD to be visible across a wide range of viewing angles. That is, visible to both an operator and passengers of the vehicle.

The present disclosure relates generally to providing restricted-viewing modes for panoramic HUDs.

SUMMARY

One aspect of the disclosure provides a vehicle including a windshield, a first head-up display (HUD) configured to display a first image on the windshield, a second HUD configured to display a second image on the windshield, data processing hardware in communication with the first HUD and the second HUD, and memory hardware in communication with the data processing hardware and storing instructions that, when executed by the data processing hardware, cause the data processing hardware to perform operations. The operations include determining that the first image is to be viewable by an operator of the vehicle and, based on determining that the first image is to be viewable by the operator, configuring the first HUD such that the first image is viewable by the operator. The operations also include determining that the second image is not to be viewable by the operator and, based on determining that the second image is not to be viewable by the operator, configuring the second HUD such that the second image is not viewable by the operator.

Implementations of the disclosure may include one or more of the following optional features. In some implementations, the operations also include determining that the first image is not to be viewable by a passenger of the vehicle and, based on determining that the first image is to be viewable by the operator and is not to be viewable by the passenger, configuring the first HUD such that the first image is viewable by the operator and is not viewable by the passenger. The operations may also include determining that the second image is to be viewable by a passenger of the vehicle and, based on determining that the second image is not to be viewable by the operator and is to be viewable by the passenger, configuring the second HUD such that the second image is not viewable by the operator and is viewable by the passenger.

In some examples, the operations also include determining that the first image is to be viewable by a passenger of the vehicle and, based on determining that the first image is to be viewable by the operator and is to be viewable by the passenger, configuring the first HUD such that the first image is viewable by the operator and is viewable by the passenger. In some implementations, determining that the second image is not to be viewable by the operator includes determining that media content is being displayed on the windshield by the second HUD. In some examples, determining that the first image is to be viewable by the operator includes determining that media content is being displayed on the windshield by the first HUD and determining that the vehicle is being autonomously operated.

In some implementations, the first HUD includes a switchable diffuser that is selectively configurable by the data processing hardware in a transparent optic state such that the first image is viewable by only the operator, or in a diffusion state such that the first image is viewable by the operator and a passenger. In some examples, the second HUD includes a switchable diffuser that is selectively configurable by the data processing hardware in a diffusion state such that the second image is viewable by the operator and a passenger, or in a transparent optic state such that the first image is viewable by only the passenger.

Another aspect of the disclosure provides a system including data processing hardware and memory hardware in communication with the data processing hardware and storing instructions that, when executed by the data processing hardware, cause the data processing hardware to perform operations. The operations include determining that a first image displayed on a windshield of a vehicle by a first head-up display (HUD) is to be viewable by an operator of the vehicle and, based on determining that the first image is to be viewable by the operator, configuring the first HUD such that the first image is viewable by the operator. The operations also include determining that a second image displayed on the windshield by a second HUD is not to be viewable by the operator and, based on determining that the second image is not to be viewable by the operator, configuring the second HUD such that the second image is not viewable by the operator.

Implementations of the disclosure may include one or more of the following optional features. In some implementations, the operations also include determining that the first image is not to be viewable by a passenger of the vehicle and, based on determining that the first image is to be viewable by the operator and is not to be viewable by the passenger, configuring the first HUD such that the first image is viewable by the operator and is not viewable by the passenger. In some examples, the operations also include determining that the first image is to be viewable by a passenger of the vehicle and, based on determining that the first image is to be viewable by the operator and is to be viewable by the passenger, configuring the first HUD such that the first image is viewable by the operator and is viewable by the passenger.

In some examples, determining that the second image is not to be viewable by the operator includes determining that media content is being displayed on the windshield by the second HUD. In some implementations, determining that the first image is to be viewable by the operator includes determining that media content is being displayed on the windshield by the first HUD and determining that the vehicle is being autonomously operated.

In some implementations, the first HUD includes a switchable diffuser that is selectively configurable by the data processing hardware in a transparent optic state such that the first image is viewable by only the operator, or in a diffusion state such that the first image is viewable by the operator and a passenger. In some examples, the second HUD includes a switchable diffuser that is selectively configurable by the data processing hardware in a diffusion state such that the second image is viewable by the operator and a passenger, or in a transparent optic state such that the first image is viewable by only the passenger.

Another aspect of the disclosure provides a computer-implemented method executed by data processing hardware that causes the data processing hardware to perform operations. The operations include determining that a first image displayed on a windshield of a vehicle by a first head-up display (HUD) is to be viewable by an operator of the vehicle and, based on determining that the first image is to be viewable by the operator, configuring the first HUD such that the first image is viewable by the operator. The operations also include determining that a second image displayed on the windshield by a second HUD is not to be viewable by the operator and, based on determining that the second image is not to be viewable by the operator, configuring the second HUD such that the second image is not viewable by the operator.

Implementations of the disclosure may include one or more of the following optional features. In some implementations, determining that the second image is not to be viewable by the operator includes determining that media content is being displayed on the windshield by the second HUD. In some examples, determining that the first image is to be viewable by the operator includes determining that media content is being displayed on the windshield by the first HUD and determining that the vehicle is being autonomously operated.

In some examples, the first HUD includes a switchable diffuser that is selectively configurable by the data processing hardware in a transparent optic state such that the first image is viewable by only the operator, or in a diffusion state such that the first image is viewable by the operator and a passenger. In some implementations, the second HUD includes a switchable diffuser that is selectively configurable by the data processing hardware in a diffusion state such that the second image is viewable by the operator and a passenger, or in a transparent optic state such that the first image is viewable by only the passenger.

BRIEF DESCRIPTION OF THE DRAWINGS

The drawings described herein are for illustrative purposes only of selected configurations and are not intended to limit the scope of the present disclosure.

FIG. 7 is a flowchart of an example arrangement of operations for providing restrictive-viewing modes for a panoramic HUD.

Corresponding reference numerals indicate corresponding parts throughout the drawings.

DETAILED DESCRIPTION

Figure 1:
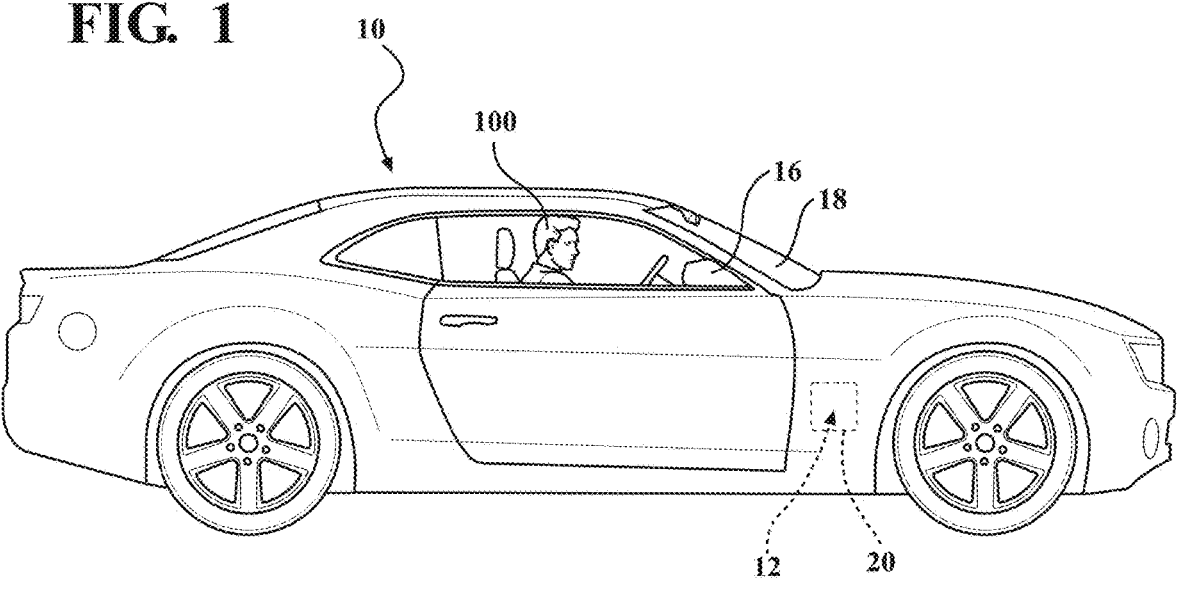
FIG. 1 is a view of an example vehicle including a panoramic head-up display (HUD) system in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A panoramic head-up display (HUD), which may also be referred to as a panoramic heads-up display, includes two, three or more HUDs that display virtual images across the width of a windshield of a vehicle. Typically, each HUD is mated with a Lambertian lighting source that allows the virtual images presented by the HUD to be visible across a wide range of viewing angles. That is, visible to both an operator and passengers of a vehicle. In some collaborative driving situations, a passenger and an operator may desire to see information presented by all of the HUDs. However, in other situations, a passenger may desire to view media content (e.g., a video) using, for example, one of the HUDs. However, for safety, in many instances, such media content cannot be legally presented, or be visible, to the operator of a vehicle. Thus, there is a need for privacy modes for a panoramic HUD display. That is, there is a need for providing restricted-viewing modes for a panoramic HUD.

While configurations are shown and described herein in connection with a vehicle (e.g., an automobile, a truck, an airplane, a train, a motorcycle, etc.), it should be understood that disclosed configurations may, additionally or alternatively, be used for providing restricted-viewing modes for a panoramic HUD for any other type of device (e.g., a video conference system, a computer, a bicycle, industrial equipment, etc.). Here, a vehicle or device may be operated by a person or may operate independently.

Figure 2:
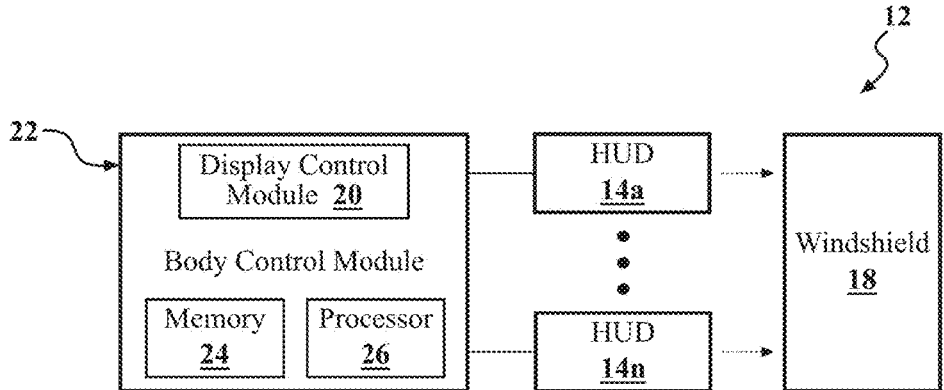
FIG. 2 is a schematic view of the panoramic HUD system of FIG. 1.
Figure 3:
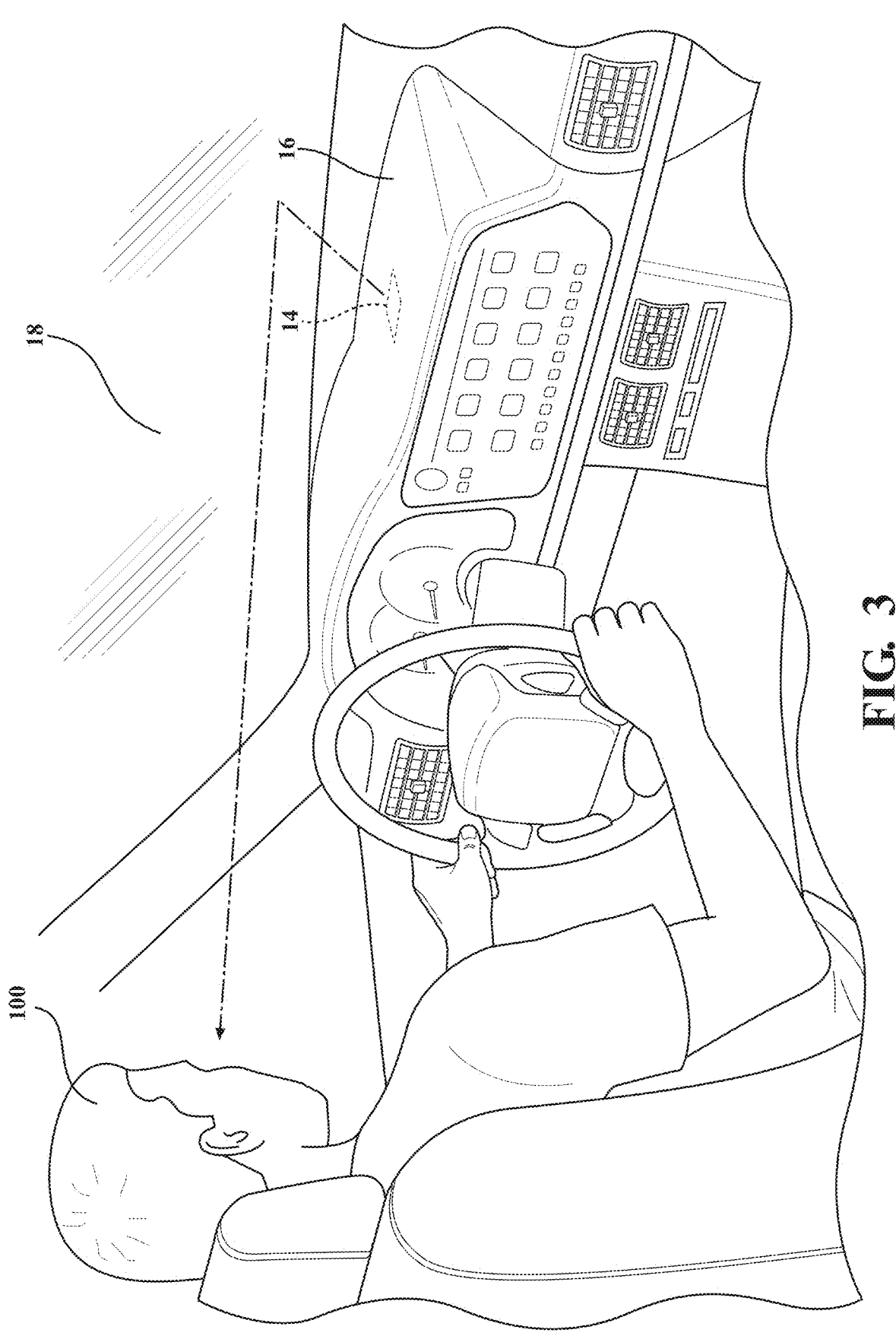
FIG. 3 is a schematic view of a dashboard including a panoramic HUD system.

With particular reference to FIGS. 1, 2, and 3, a vehicle 10 (e.g., an automobile, a truck, an airplane, a train, a motorcycle, etc.) is shown in conjunction with a panoramic head-up display (HUD) system 12 for providing a panoramic HUD. The vehicle 10 includes two, three or more HUDs 14, 14a-n that are deployed, positioned, or otherwise provided in a dashboard 16 of the vehicle 10 facing a windshield 18 of the vehicle 10. Each of the HUDs 14 is configured to display respective images toward and on the windshield 18 of the vehicle 10. The displayed images are reflected by the windshield 18 back toward occupants 100, 100a-n of the vehicle 10. Here, the occupants 100 view the images as virtual images that are perceived to be in front of the vehicle 10. The HUDs 14 are configured to display the virtual images across a width of the windshield 18 to provide a panoramic HUD. In some examples, the HUDs 14 display the images in a blacked-out portion of the windshield 18. In some implementation, the panoramic HUD system 12 includes a left HUD 14a to display images on the windshield 18 in front of an operator 100a of the vehicle 10, a center HUD 14b to display images on the windshield 18 between the operator 100a and a passenger 100b in the vehicle 10, and a right HUD 14c to display images on the windshield 18 in front of the passenger 100b.

The panoramic HUD system 12 includes a display control module 20 for controlling restricted-viewing modes of the panoramic HUD. The display control module 20 may be executed on a body control module (BCM) 22, or any other controller, of the vehicle 10. Specifically, the BCM 22 stores machine-readable instructions for executing the display control module 20 on, for example, memory hardware 24. The instructions may be executed by data processing hardware 26 (e.g., a processor) of the BCM 22 to execute the display control module 20. Here, the display control module 20 performs the operations shown in FIGS. 7 and 8, or operations described elsewhere in the present disclosure.

Figures 4A, 4B:
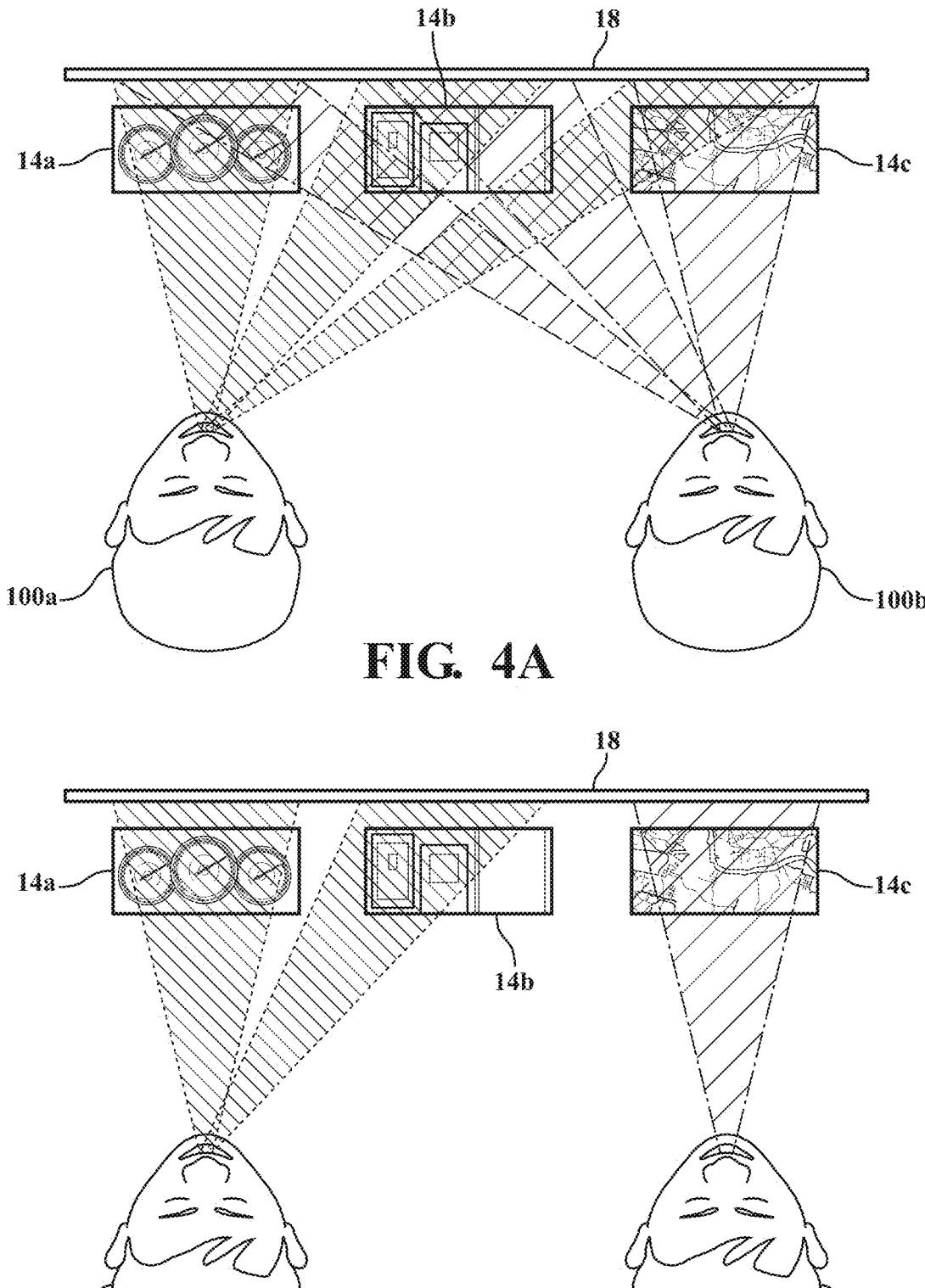
FIGS. 4A and 4B illustrate example restricted-viewing modes for a panoramic HUD system.

As shown in FIGS. 4A and 4B, the display control module 20 may configure the HUDs 14 for providing different viewing modes, including restricted-viewing modes. In the example of FIG. 4A, the display control module 20 configures the HUDs 14 such that an operator 100a and a passenger 100b are able to view images displayed by all of the HUDs 14.

In contrast, in the example of FIG. 4B, the display control module 20 configures a left HUD 14a and a center HUD 14b such that only the operator 100a is able to view images displayed by the left HUD 14a and the center HUD 14b and configures a right HUD 14c such that only the passenger 100b is able to view images displayed by the right HUD 14c. In this illustrated example, the operator 100a is restricted from viewing images displayed by the right HUD 14c, and the passenger 100b is restricted from viewing images displayed by the left HUD 14a and the center HUD 14b. Such a restricted-viewing mode allows, for example, the right HUD 14c to display entertainment media for the passenger 100b without distracting the operator 100a who needs to pay attention to operating the vehicle 10 and allows the left HUD 14a and the center HUD 14b to display information for the operator 100a without distracting the passenger 100b.

Figures 5A, 5B:
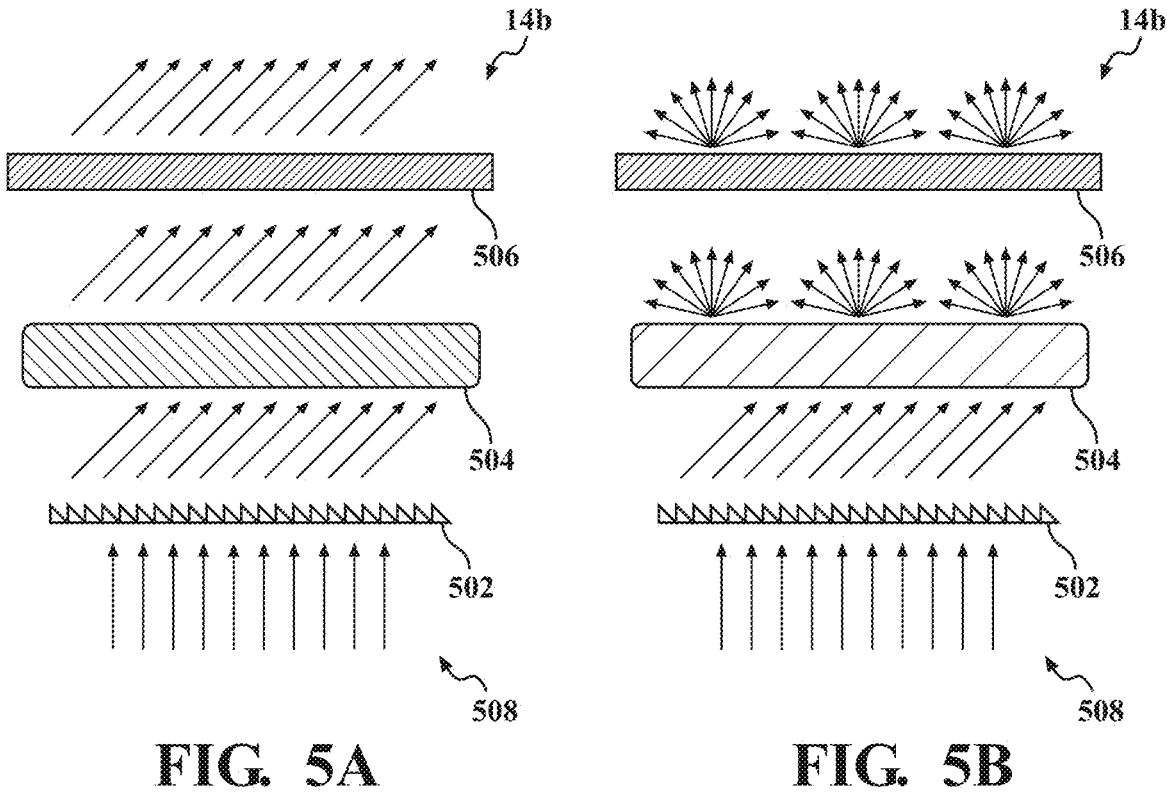
FIGS. 5A and 5B illustrate an example HUD for providing restricted-viewing modes for a panoramic HUD.

FIGS. 5A and 5B are a schematic view of an example center HUD 14b that can be controlled to present images to just the operator 100a, or to both the operator 100a and the passenger 100b. The center HUD 14b includes a lenticular array 502, a switchable diffuser 504 (e.g., a liquid-crystal (LC) diffuser), and a liquid-crystal display (LCD) 506. In the illustrated example, the lenticular array 502 is configured to direct collimated light 508 from a collimated light source (not shown for clarity of illustration) toward the operator 100a. The switchable diffuser 504 is selectively configurable by the display control module 20 as a transparent optic (FIG. 5A) or a diffuser (FIG. 5B). As shown in FIG. 5A, when the switchable diffuser 504 is configured as a transparent optic, images displayed by the center HUD 14b are only viewable by the operator 100a. As shown in FIG. 5B, when the switchable diffuser 504 is configured as a diffuser, images displayed by the center HUD 14b are viewable by both the operator 100a and the passenger 100b.

Figures 6A, 6B:
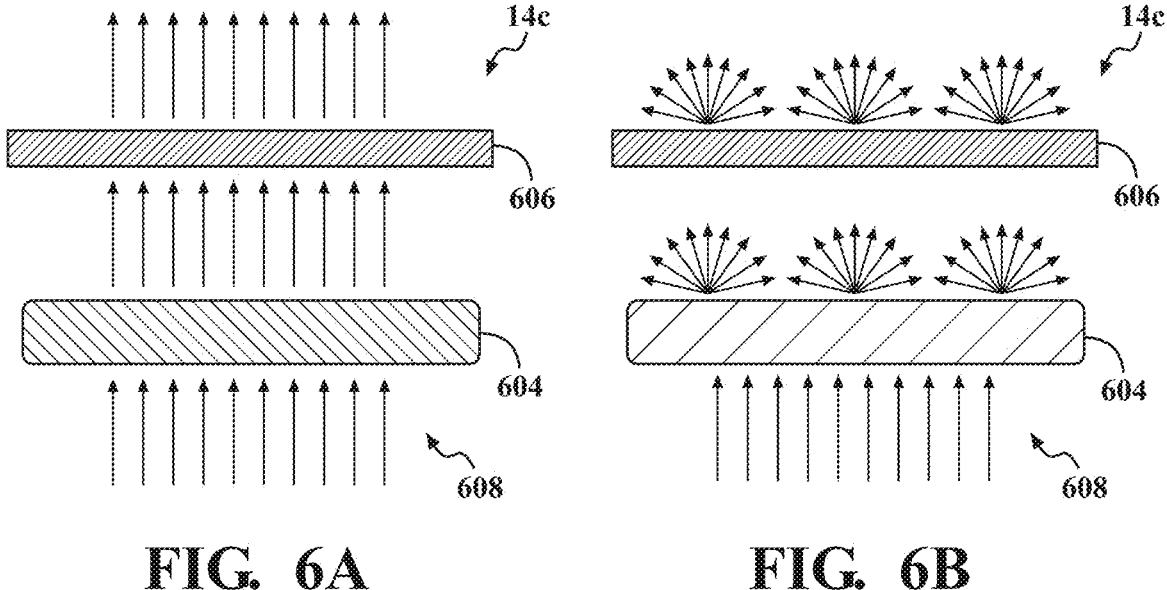
FIGS. 6A and 6B illustrate another example HUD for providing restricted-viewing modes for a panoramic HUD.

FIGS. 6A and 6B are a schematic view of an example right HUD 14c that can be controlled to present images to just the passenger 100*b*, or to both the operator 100*a* and the passenger 100*b*. The right HUD 14*c* includes a switchable diffuser 604 (e.g., an LC diffuser) and an LCD 606. In the illustrated example, the switchable diffuser 604 is selectively configurable by the display control module 20 as a transparent optic (FIG. 6A) or a diffuser (FIG. 6B). As shown in FIG. 6A, when the LC diffuser 604 is configured as a transparent optic, images displayed by the right HUD 14*c* are only viewable by the passenger 100*b*. As shown in FIG. 6B, when the switchable diffuser 604 is configured as a diffuser, images displayed by the right HUD 14*c* are viewable by both the operator 100*a* and the passenger 100*b*.

FIG. 7 is a flowchart of an example arrangement of operations for providing restricted-viewing modes for a panoramic HUD. The operations may be performed by data processing hardware (e.g., the processor 26) based on executing instructions stored on memory (e.g., the memory hardware 24). Many other ways of implementing the method 700 may be employed. For example, the order of execution of the operations may be changed, and/or one or more of the operations and/or interactions may be changed, eliminated, sub-divided, or combined. Additionally, the operations of FIG. 7 may be carried out sequentially and/or in parallel by, for example, separate processing threads, processors, devices, discrete logic, circuits, etc.

At operation 702, the method 700 includes determining whether the right HUD 14*c* is in use for displaying media (e.g., a video). At operation 704, if the right HUD 14*c* is not displaying media, the method 700 includes configuring all of the HUDs 14 to Lambertian mode such that images displayed by the HUDs 14 are viewable by the operator 100*a* and the passenger 100*b*.

At operation 706, if the right HUD 14*c* is displaying media, the method 700 includes determining whether the vehicle 10 is operating autonomously (e.g., in an L3, L4, or L5 state). At operation 708, if the vehicle 10 is not operating autonomously, the method 700 includes configuring the right HUD 14*c* so that only the passenger 100*b* can view the media. At operation 710, the method 700 includes configuring the center HUD 14*b* so that only the operator 100*a* can view images displayed by the center HUD 14*b*. At operation 712, the method 700 includes configuring the left HUD 14*a* so that only the operator 100*a* can view images displayed by the left HUD 14*a*.

At operation 714, if the vehicle 10 is operating autonomously, the method 700 includes configuring all of the HUDs 14 to Lambertian mode such that images displayed by the HUDs 14 are viewable by the operator 100*a* and the passenger 100*b*.

Figure 8:
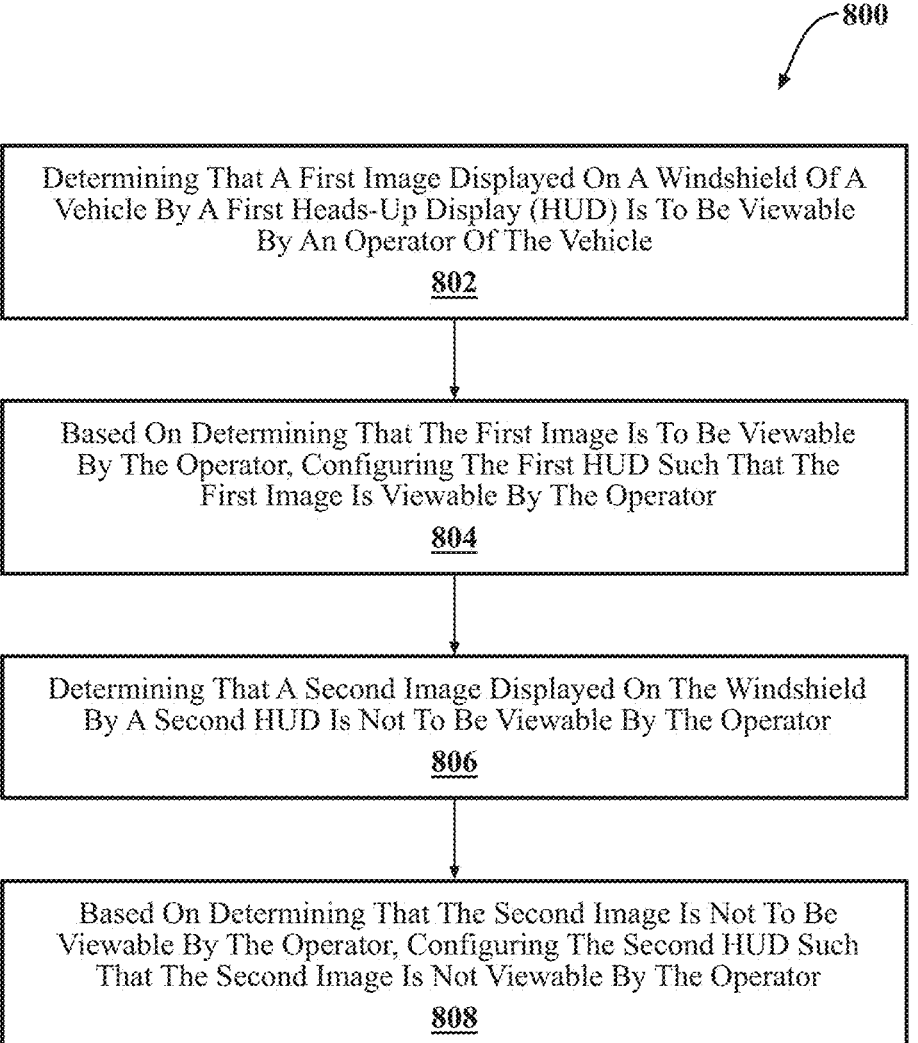
FIG. 8 is a flowchart of another example arrangement of operations for providing restrictive-viewing modes for a panoramic HUD.

FIG. 8 is a flowchart of an example arrangement of operations for providing restricted-viewing modes for a panoramic HUD. The operations may be performed by data processing hardware (e.g., the processor 26) based on executing instructions stored on memory (e.g., the memory hardware 24). Many other ways of implementing the method 800 may be employed. For example, the order of execution of the operations may be changed, and/or one or more of the operations and/or interactions may be changed, eliminated, sub-divided, or combined. Additionally, the operations of FIG. 8 may be carried out sequentially and/or in parallel by, for example, separate processing threads, processors, devices, discrete logic, circuits, etc.

At operation 802, the method 800 include determining that a first image displayed on a windshield 18 of a vehicle 10 by a first HUD 14 is to be viewable by the operator 100*a* of the vehicle 10. At operation 804, the method 800 includes, based on determining that the first image is to be viewable by the operator 100*a*, configuring the first HUD 14 such that the first image is viewable by the operator. At operation 806, the method 800 includes determining that a second image displayed on the windshield 18 by a second HUD 14 is not to be viewable by the operator 100*a*. At operation 808, the method 800 includes, based on determining that the second image is not to be viewable by the operator 100*a*, configuring the second HUD 14 such that the second image is not viewable by the operator 100*a*.

In some examples, the method 800 also includes determining that the first image is not to be viewable by the passenger 100*b* of the vehicle 10 and, based on determining that the first image is to be viewable by the operator 100*a* and is not to be viewable by the passenger 100*b*, configuring the first HUD 14 such that the first image is viewable by the operator 100*a* and is not viewable by the passenger 100*b*. Here, the method 800 may further include determining that the second image is to be viewable by the passenger 100*b* of the vehicle 10 and, based on determining that the second image is not to be viewable by the operator 100*a* and is to be viewable by the passenger 100*b*, configuring the second HUD 14 such that the second image is not viewable by the operator 100*a* and is viewable by the passenger 100*b*.

In some examples, the method 800 also includes determining that the first image is to be viewable by the passenger 100*b* of the vehicle 10 and, based on determining that the first image is to be viewable by the operator 100*a* and is to be viewable by the passenger 100*b*, configuring the first HUD 14 such that the first image is viewable by the operator 100*a* and is viewable by the passenger 100*b*.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:
1. A vehicle comprising:
a windshield;
a first head-up display (HUD) selectively configurable, during operation of the vehicle, to display a first image on the windshield that is selectively visible by an operator of the vehicle or a passenger of the vehicle;
a second HUD selectively configurable, during operation of the vehicle, to display a second image on the windshield that is selectively visible by the operator or the passenger;
data processing hardware in communication with the first HUD and the second HUD; and
memory hardware in communication with the data processing hardware and storing instructions that, when executed by the data processing hardware, cause the data processing hardware to perform operations while the vehicle is operating, the operations comprising:
determining that the first image is to be viewable by an operator of the vehicle;

based on determining that the first image is to be viewable by the operator, configuring the first HUD such that the first image is viewable by the operator;

determining, based on the second image comprising media content and that the vehicle is not operating autonomously, that the second image is not to be viewable by the operator; and based on determining that the second image is not to be viewable by the operator, configuring the second HUD such that the second image is not viewable by the operator.

2. The vehicle of claim 1, wherein the operations further comprise:

determining that the first image is not to be viewable by a passenger of the vehicle; and based on determining that the first image is to be viewable by the operator and is not to be viewable by the passenger, configuring the first HUD such that the first image is viewable by the operator and is not viewable by the passenger.

3. The vehicle of claim 2, wherein the operations further comprise:

determining that the second image is to be viewable by a passenger of the vehicle; and based on determining that the second image is not to be viewable by the operator and is to be viewable by the passenger, configuring the second HUD such that the second image is not viewable by the operator and is viewable by the passenger.

4. The vehicle of claim 1, wherein the operations further comprise:

determining that the first image is to be viewable by a passenger of the vehicle; and based on determining that the first image is to be viewable by the operator and is to be viewable by the passenger, configuring the first HUD such that the first image is viewable by the operator and is viewable by the passenger.

5. The vehicle of claim 1, wherein determining that the first image is to be viewable by the operator comprises:

determining that media content is being displayed on the windshield by the first HUD; and determining that the vehicle is being autonomously operated.

6. The vehicle of claim 1, wherein the first HUD comprises a switchable diffuser that is selectively configurable by the data processing hardware in a transparent optic state such that the first image is viewable by only the operator, or in a diffusion state such that the first image is viewable by the operator and a passenger.

7. The vehicle of claim 1, wherein the second HUD comprises a switchable diffuser that is selectively configurable by the data processing hardware in a diffusion state such that the second image is viewable by the operator and a passenger, or in a transparent optic state such that the second image is viewable by only the passenger.

8. The vehicle of claim 1, wherein:

the first HUD comprises a first liquid-crystal display (LCD), a first switchable diffuser disposed in a first optical path between the first LCD and the windshield, and a first lenticular array configured to direct collimated light toward the operator, and wherein the first switchable diffuser is selectively configurable by the data processing hardware in (i) a transparent optic state in which the first image is viewable by only the operator due to the first lenticular array directing the collimated light toward the operator, and (ii) a diffusion state in which the first image is viewable by both the operator and a passenger;

the second HUD comprises a second LCD and a second switchable diffuser disposed in a second optical path between the second LCD and the windshield and selectively configurable by the data processing hardware in (i) a transparent optic state in which the second image is viewable by only the passenger and (ii) a diffusion state in which the second image is viewable by both the operator and the passenger; and the operations further comprise:

based on determining that the second image is not to be viewable by the operator, configuring the first HUD to the transparent optic state and configuring the second HUD to the transparent optic state; and based on determining that the second image is to be viewable by the operator, configuring the second HUD to the diffusion state.

9. A system of a vehicle, the system comprising:

data processing hardware; and memory hardware in communication with the data processing hardware and storing instructions that, when executed by the data processing hardware, cause the data processing hardware to perform operations while the vehicle is operating, the operations comprising:

controlling a first head-up display (HUD) of the vehicle that is selectively configurable, during operation of the vehicle, to display a first image on a windshield of the vehicle that is selectively visible by an operator of the vehicle or a passenger of the vehicle;

controlling a second HUD that is selectively configurable, during operation of the vehicle, to display a second image on the windshield that is selectively visible by the operator or the passenger;

determining that the first image displayed on the windshield of a vehicle by the first HUD is to be viewable by the operator;

based on determining that the first image is to be viewable by the operator, configuring the first HUD such that the first image is viewable by the operator;

determining, based on the second image comprising media content and that the vehicle is not operating autonomously, that the second image displayed on the windshield by the second HUD is not to be viewable by the operator; and based on determining that the second image is not to be viewable by the operator, configuring the second HUD such that the second image is not viewable by the operator.

10. The system of claim 9, wherein the operations further comprise:

determining that the first image is not to be viewable by a passenger of the vehicle; and based on determining that the first image is to be viewable by the operator and is not to be viewable by the passenger, configuring the first HUD such that the first image is viewable by the operator and is not viewable by the passenger.

11. The system of claim 9, wherein the operations further comprise:

determining that the first image is to be viewable by a passenger of the vehicle; and based on determining that the first image is to be viewable by the operator and is to be viewable by the passenger, configuring the first HUD such that the first image is viewable by the operator and is viewable by the passenger.

12. The system of claim 9, wherein determining that the first image is to be viewable by the operator comprises:

determining that media content is being displayed on the windshield by the first HUD; and determining that the vehicle is being autonomously operated.

13. The system of claim 9, wherein the first HUD comprises a switchable diffuser that is selectively configurable by the data processing hardware in a transparent optic state such that the first image is viewable by only the operator, or in a diffusion state such that the first image is viewable by the operator and a passenger.

14. The system of claim 9, wherein the second HUD comprises a switchable diffuser that is selectively configurable by the data processing hardware in a diffusion state such that the second image is viewable by the operator and a passenger, or in a transparent optic state such that the second image is viewable by only the passenger.

15. The system of claim 9, wherein:

the first HUD comprises a first liquid-crystal display (LCD), a first switchable diffuser disposed in a first optical path between the first LCD and the windshield, and a first lenticular array configured to direct collimated light toward the operator, and wherein the first switchable diffuser is selectively configurable by the data processing hardware in (i) a transparent optic state in which the first image is viewable by only the operator due to the first lenticular array directing the collimated light toward the operator, and (ii) a diffusion state in which the first image is viewable by both the operator and a passenger;

the second HUD comprises a second LCD and a second switchable diffuser disposed in a second optical path between the second LCD and the windshield and selectively configurable by the data processing hardware in (i) a transparent optic state in which the second image is viewable by only the passenger and (ii) a diffusion state in which the second image is viewable by both the operator and the passenger; and the operations further comprise:

based on determining that the second image is not to be viewable by the operator, configuring the first HUD to the transparent optic state and configuring the second HUD to the transparent optic state; and based on determining that the second image is to be viewable by the operator, configuring the second HUD to the diffusion state.

16. A computer-implemented method executed by data processing hardware of a vehicle that causes the data processing hardware to perform operations while the vehicle is operating, the operations comprising:

controlling a first head-up display (HUD) of the vehicle that is selectively configurable, during operation of the vehicle, to display a first image on a windshield of the vehicle that is selectively visible by an operator of the vehicle or a passenger of the vehicle;

controlling a second HUD that is selectively configurable, during operation of the vehicle, to display a second image on the windshield that is selectively visible by the operator or the passenger;

determining that the first image displayed on the windshield of a vehicle by the first HUD is to be viewable by the operator;

based on determining that the first image is to be viewable by the operator, configuring the first HUD such that the first image is viewable by the operator;

determining, based on the second image comprising media content and that the vehicle is not operating autonomously, that the second image displayed on the windshield by the second HUD is not to be viewable by the operator; and based on determining that the second image is not to be viewable by the operator, configuring the second HUD such that the second image is not viewable by the operator.

17. The computer-implemented method of claim 16, wherein determining that the first image is to be viewable by the operator comprises:

determining that media content is being displayed on the windshield by the first HUD; and determining that the vehicle is being autonomously operated.

18. The computer-implemented method of claim 16, wherein the first HUD comprises a switchable diffuser that is selectively configurable by the data processing hardware in a transparent optic state such that the first image is viewable by only the operator, or in a diffusion state such that the first image is viewable by the operator and a passenger.

19. The computer-implemented method of claim 16, wherein the second HUD comprises a switchable diffuser that is selectively configurable by the data processing hardware in a diffusion state such that the second image is viewable by the operator and a passenger, or in a transparent optic state such that the second image is viewable by only the passenger.

20. The computer-implemented method of claim 16, wherein:

the first HUD comprises a first liquid-crystal display (LCD), a first switchable diffuser disposed in a first optical path between the first LCD and the windshield, and a first lenticular array configured to direct collimated light toward the operator, and wherein the first switchable diffuser is selectively configurable by the data processing hardware in (i) a transparent optic state in which the first image is viewable by only the operator due to the first lenticular array directing the collimated light toward the operator, and (ii) a diffusion state in which the first image is viewable by both the operator and a passenger;

the second HUD comprises a second LCD and a second switchable diffuser disposed in a second optical path between the second LCD and the windshield and selectively configurable by the data processing hardware in (i) a transparent optic state in which the second image is viewable by only the passenger and (ii) a diffusion state in which the second image is viewable by both the operator and the passenger; and the operations further comprise:

based on determining that the second image is not to be viewable by the operator, configuring the first HUD to the transparent optic state and configuring the second HUD to the transparent optic state; and based on determining that the second image is to be viewable by the operator, configuring the second HUD to the diffusion state.

* * * * *